(12) United States Patent
Lin et al.

(10) Patent No.: US 8,252,214 B2
(45) Date of Patent: Aug. 28, 2012

(54) GAS EXTRACTION METHOD FROM MOLD CAVITY

(75) Inventors: Chin-Pai Lin, Shin-dian (TW); Dian-Hong Wei, Shen-zhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 182 days.

(21) Appl. No.: 12/288,622

(22) Filed: Oct. 22, 2008

(65) Prior Publication Data

US 2009/0053355 A1 Feb. 26, 2009

Related U.S. Application Data

(63) Continuation of application No. 11/556,093, filed on Nov. 2, 2006, now abandoned.

(30) Foreign Application Priority Data

Dec. 23, 2005 (CN) .......................... 2005 1 0121184

(51) Int. Cl.
*B29C 45/63* (2006.01)
(52) U.S. Cl. ................. 264/102; 264/328.1; 264/328.12
(58) Field of Classification Search .................. 264/102, 264/328.1, 328.12; 425/812
See application file for complete search history.

(56) References Cited

U.S. PATENT DOCUMENTS

| 3,433,291 | A | * | 3/1969 | Fritz | 164/305 |
| 5,350,288 | A | | 9/1994 | Kimoto et al. | |
| 5,824,350 | A | * | 10/1998 | Wietrzynski | 425/190 |
| 6,422,850 | B1 | * | 7/2002 | Shannon et al. | 425/116 |
| 6,537,053 | B1 | * | 3/2003 | Watkins | 425/190 |

FOREIGN PATENT DOCUMENTS

| CN | 2691828 Y | 4/2005 |
| JP | 61-235108 A | 10/1986 |
| TW | M252542 | 12/2004 |
| TW | 200518904 A | 6/2005 |

* cited by examiner

*Primary Examiner* — Joseph Del Sole
*Assistant Examiner* — James Sanders
(74) *Attorney, Agent, or Firm* — Altis Law Group, Inc.

(57) ABSTRACT

A gas extraction method including: providing an injection mold apparatus (100) including a mold cavity (300), a gas vent (490) and a gas vent pin (49), the mold cavity including an end portion of a material injection path (210), the gas vent communicating with the end portion, the gas vent pin being received in the gas vent; injecting molten material into the mold cavity and toward the end portion; venting gas from a gap between the gas vent pin and the gas vent as molten material is injected into the mold cavity; driving the gas vent pin to substantially close the end portion of the material injection path when the mold cavity having been injected with molten material to about 95 percent of a capacity of the mold cavity.

3 Claims, 1 Drawing Sheet

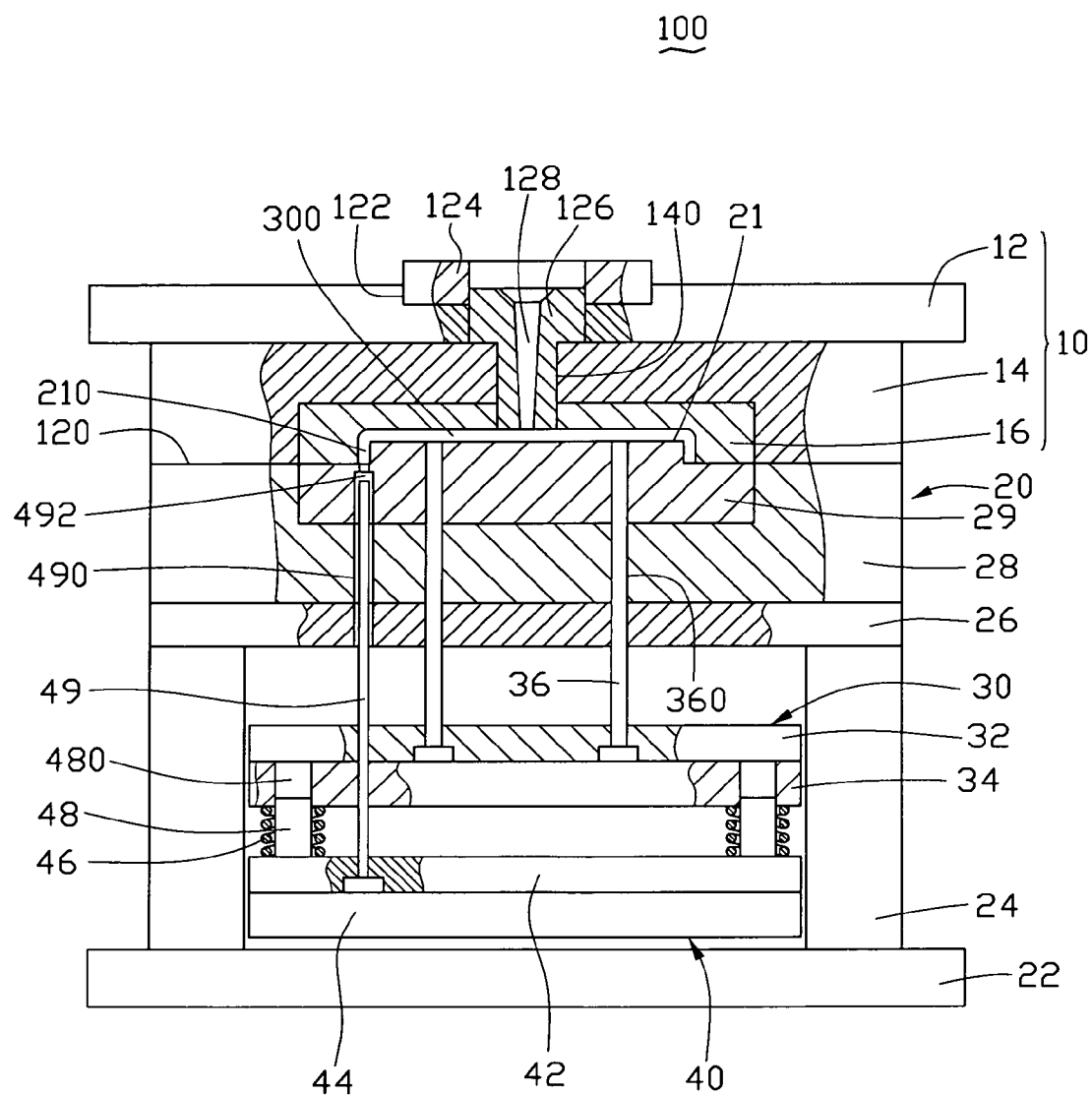

GAS EXTRACTION METHOD FROM MOLD CAVITY

CROSS-REFERENCE TO RELATED APPLICATION

This application is a continuation application of U.S. Ser. No. 11/556,093, filed Nov. 2, 2006.

BACKGROUND OF THE INVENTION

1. Field of the Invention

The present invention relates to gas extraction devices for molds and, particularly, to a gas extraction method for a plastic molding mold capable of sufficiently removing air and reaction product gases from a cavity of a mold.

2. Description of Related Art

Most products made of polymers or other plastics are typically created using injection molds. During a typical injection molding process, a molten material is injected into a mold cavity via a runner. The molten material in the cavity is cooled to form the molded product.

However, the molten material usually contains air or reaction product gases. If the gas in the cavity is not extracted, the gas might affect the formation of the final product. In a conventional injection mold apparatus, a means of extracting gas uses a plurality of venting holes defined at a parting plane between two separable sections of the injection mold. Alternatively, the gas is exhausted through a gap between an ejector pin and an ejector pin hole. However, these conventional venting methods create surface burrs on the molded product.

Therefore, an improved gas extraction method is desired in order to overcome the above-described problems.

BRIEF DESCRIPTION OF THE DRAWING

Many aspects of the present gas extraction method can be better understood with reference to the following drawing. The components in the drawing are not necessarily drawn to scale, the emphasis instead being placed upon clearly illustrating the principles of the present gas extraction method. Moreover, in the drawing, like reference numerals designate corresponding parts throughout the several views, in which:

FIG. 1 is a partial cross-sectional view of a mold apparatus including a gas extraction structure in accordance with one embodiment of the present invention.

DETAILED DESCRIPTION OF THE EMBODIMENT

Referring now to the drawing in detail, FIG. 1 shows a gas extraction structure for a mold in accordance with one embodiment of the present invention. In an exemplary application, the gas extraction structure is incorporated in an injection mold apparatus 100.

The injection mold apparatus 100 includes an upper mold 10, a lower mold 20, an ejector structure 30, and a gas extraction structure 40. The upper mold 10 and the lower mold 20 may be separable from each other. When the upper and lower molds 10, 20 are engaged together, a parting plane 120 is formed between them.

The upper mold 10 includes an upper fixed plate 12, an upper mold part 14, and an upper mold core 16. The upper fixed plate 12, the upper mold part 14, and the upper mold core 16 are fixed together by means of screws, so that the upper mold 10 forms a fixed side of the injection mold apparatus 100.

The upper fixed plate 12 is substantially square, and may be fixedly attached in the injection mold apparatus 100. The upper fixed plate 12 defines an opening 122 in a central area thereof. A positioning ring 124 is engaged in the opening 122. The upper mold part 14 defines a recess, and the upper mold core 16 is engaged in the recess. The upper mold part 14 and the upper mold core 16 respectively define a common through hole 140 in central areas thereof. The through hole 140 communicates with the opening 122 of the upper mold core 16. A bush 126 is inserted into the positioning ring 124, so that a bottom end of the bush 126 is received in the through hole 140, and a top end of the bush 126 is received in the positioning ring 124. The bush 126 has a runner 128 defined in a central area thereof. The bush 126 is used seating a nozzle (not shown) of the injector mold apparatus 100. The positioning ring 124 may help the nozzle align with the runner 128 of the bush 126.

The lower mold 20 includes a lower fixed plate 22, two spaced blocks 24, a support plate 26, a lower mold part 28, and a lower mold core 29. The lower fixed plate 22, the spaced blocks 24, the support plate 26, the lower mold part 28 and the lower mold core 29 are fixed together by means of screws, so that the lower mold 20 forms a movable side of the injection mold apparatus 100.

The lower fixed plate 22 is substantially square, and is fixed to a movable disk (not shown) of the injection mold apparatus 100. Each spaced block 24 is substantially rectangular, and is supported on one of two ends of the lower fixed plate 22. The spaced blocks 24 are of a height sufficient to provide a desired distance between the lower fixed plate 22 and the support plate 26. The support plate 26 is fixed on the two spaced blocks 24. The lower mold part 28 is fixed on the support plate 26. The lower mold part 28 defines a recess, and the lower mold core 29 is engaged in the recess. When the upper and lower mold cores 16, 29 are engaged together, they cooperatively form a mold cavity 300 therebetween. The runner 128 communicates with the mold cavity 300 so that molten material such as molten plastic may flow along the runner 128 into the mold cavity 300. The support plate 26, the lower mold part 28 and the lower mold core 29 cooperatively define a plurality of common through holes 360. The support plate 26, the lower mold part 28 and the lower mold core 29 together cooperatively a common gas vent 490.

The ejector structure 30 is movably positioned above the lower fixed plate 22, between the two spaced blocks 24. The ejector structure 30 includes a first ejector plate 32, a second ejector plate 34, and a plurality of ejector pins 36.

The first ejector plate 32 defines a plurality of stepped holes 320. Each ejector pin 36 extends through a corresponding stepped hole 320, and is movably received in a corresponding through hole 360. The second ejector plate 34 is fixed on a bottom side of the first ejector plate 32. Thus one end of each ejector pin 36 is locked into the corresponding stepped hole 320 by the second ejector plate 34, so as to fix all the ejector pins 36 in the ejector structure 30.

The gas extraction structure 40 includes a first support plate 42, a second support plate 44, two springs 46, two rods 48, and a gas vent pin 49.

The first support plate 42 and the second support plate 44 are positioned between the two spaced blocks 24, under the second ejector plate 34. The first support plate 42 and the second support plate 44 are fixed together. The second ejector plate 34 defines two guide holes 480. A diameter of the guide holes 480 is slightly larger than that of the rods 48. A bottom end of each rod 48 is fixed to the first support plate 42, and a top end of each rod 48 is movably received in a corresponding guide hole 480. A portion of each rod 48 below the second ejector plate 34 is surrounded by a corresponding spring 46. A diameter of each spring 46 is larger than that of each guide hole 480. Accordingly, the springs 46 resist both the second ejector plate 34 and the first support plate 42. If the first support plate 42 and the second support plate 44 are pressed upward, the first support plate 42 and the second support plate 44 move together relative to the first ejector plate 32 and the second ejector plate 34, with the rods 48 sliding along the guide holes 480.

The mold cavity 300 has a distal end portion 210 of a plastic injection path. That is, when the molten plastic is injected into the mold cavity 300, the molten plastic follows a path within the mold cavity 300 toward the distal end portion 210. Depending on the circumstances, the end portion 210 either remains empty or is the last portion of mold cavity 300 to be filled with molten material. The gas vent pin 49 is received in the gas vent 490. A connecting aperture 492 connects the gas vent 490 with the end portion 210 of the mold cavity 300. A diameter of the connecting aperture 492 is smaller than that of the gas vent 490, thereby forming a step where the connecting aperture 492 adjoins the gas vent 490. A diameter of the gas vent pin 49 is smaller than that of the gas vent 490, and slightly smaller than that of the connecting aperture 492, so that the gas vent pin 49 can be movably received in the gas vent 490 and the connecting aperture 492. A small gap between the wall of the gas vent 490 and the gas vent pin 49 needs to be of sufficient size so that most of unwanted air or reaction product gases can be vented therebetween.

The steps of an exemplary gas extraction method is described. Before the molten material (such as molten plastic or molten resin) is injected into the mold cavity 300, the mold cavity 300 typically has air inside. The first support plate 42 and the second support plate 44 are in an original passive position relative to the first and second ejector pin plates 32, 34. In this position, the gas vent pin 49 is farthest from the end portion 210. When the molten plastic is injected, the molten plastic firstly injects from the nozzle of the mold apparatus 100. Then, the molten plastic flows into the runner 128 of the bush 126. Because the runner 128 communicates with the mold cavity 300, the molten plastic further flows into the mold cavity 300. During this filling process, the molten plastic brings air and reaction product gases into the mold cavity 300. While the molten plastic continues to fill the mold cavity 300, a part of the air and reaction product gases in the mold cavity 300 is vented through the gas vent 490 via the connecting aperture 492. The molten plastic material gradually approaches the end portion 210 as more and more molten plastic material is injected. After about 95 percent of the capacity of the mold cavity has been filled with molten plastic, the first support plate 42 and the second support plate 44 are pushed upward by a driving structure (not shown) of the mold apparatus 100. Therefore, the gas vent pin 49 moves upward until a top surface of the gas vent pin 49 is substantially coplanar with a corresponding part of the lower mold core 29 at a top of the connecting aperture 492. The gas vent pin 49 substantially closes the end portion 210 of the molding cavity 300. During this time, the molten plastics continues to be injected into the mold cavity 300, and a remaining amount of the air and reaction product gases is driven into a small gap remaining between the gas vent pin 49 and a wall of the connecting aperture 492 and vented out through the gas vent 490. The molten material gradually fills in the end portion 210. Once the molten plastic has filled the whole mold cavity 300, all of the remaining air and reaction product gases has been completely vented from the mold cavity 300 into the gap and out through the gas vent 490. At the same time, the gas vent pin 49 encloses the end portion 210 so that the molten plastic cannot flow in the connecting aperture 492.

Finally, after cooling of the molten plastic, the upper mold 20 is separated from the lower mold 10. Then the first ejector pin plate 32, the second ejector pin plate 34, the first support plate 42 and the second support plate 44 are moved together by a back rod (not shown) of the injection mold apparatus 100 so as to make the ejector pins 36 and the gas vent pin 49 move up and push the solidified plastic piece. Thus, the molded product is pushed out from engagement with the lower mold core 29. When the driving force by the back rod is released, the springs 48 rebound, and the first support plate 42 and the second support plate 44 can return to their original passive position relative to the first and second ejector pin plates 32, 34. Typically, when the solidified plastic piece is pushed out from engagement with the lower mold core 29, no molten plastic may enter the gap because the gap is sufficiently small. In such cases, with the top surface of the gas vent pin 49 being coplanar with the part of the lower mold core 29 at the top of the connecting aperture 492, the surface of the molded product at this location only has a small mark from the gas vent pin 49. Because a size of the mark is small such that a surface of the molded product at the point of the end portion 210 cannot be effected. The mark is typically formed on an inside surface of the molded product. Therefore, the mark does not also effect the work surface of the molded product.

As described above, the gas vent pin 49 is configured to allow the air and reaction product gases in the mold cavity 300 to vent out therefrom, as well as to help eject the molded product. A main advantage of the gas extraction method is that the molded product not only has good stiffness in a central portion thereof due to the absence of air and reaction product gases during formation, but also may achieve a good appearance. The gas extraction method may greatly improve the product quality at relatively little cost.

The above-described gas extraction method can be used with other kinds of molding apparatuses besides the injection mold apparatus 100 illustrated, or with other kinds of apparatuses that need a gas extraction method. The products formed can have good mechanical strength as well as a smooth, attractive appearance.

It is believed that the present embodiment and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A gas extraction method for a sheet molded product, comprising:

providing an injection mold apparatus including an upper mold and a lower mold, a parting plane and a sheet mold cavity defined between the upper mold and the lower mold, a material inlet defined in the upper mold, a gas vent and a connecting aperture defined in the lower mold, and a gas vent pin, the mold cavity including an entrance portion and only an end portion of a material injection path, the gas vent and the end portion positioned at opposite sides of the parting plane, the material inlet communicating with the entrance portion and the connecting aperture connecting the gas vent with the end portion, the gas vent pin being received in the gas vent and toward an inside surface of the molded product;

injecting molten material into the mold cavity through the material inlet; whereby as the mold cavity begins to be filled, molten material flows toward the only end portion;

venting a part of gas from a first gap between the gas vent pin and the gas vent as molten material is injected into the mold cavity;

after the mold cavity is filled with molten material to about 95 percent of the mold cavity's capacity, the vent pin is driven in the connecting aperture as additional molten material and additional gas are injected into the mold cavity;

making the gas vent pin coplanar with the parting plane to substantially close the connecting aperture and the gas vent of the material injection path, wherein during this time, the remaining amount of the gas and the additional gas are completely vented from the mold cavity into a second gap between the gas vent pin and the connecting aperture and out through the first gap, and whereby the gas vent pin forms a mark on the inside surface of the molded product.

2. The method as claimed in claim 1, wherein a diameter of the gas vent pin is slightly smaller than that of a connecting aperture, and is smaller than that of the main portion of the gas vent.

3. A gas extraction method for molding a sheet of plastic product, comprising:

providing an injection mold apparatus including:

an upper mold and a lower mold, a parting plane and a sheet mold cavity defined between the upper mold and the lower mold, the mold cavity having a first end and a second end opposite the first end, a material inlet defined in the upper mold closer to the second end than the first end, a gas vent and a connecting aperture defined in the lower mold adjacent the first end, the mold cavity including an entrance portion and a closed portion adjacent the second end, the gas vent and the closed portion positioned at opposite sides of the parting plane, the material inlet communicating with the entrance portion and the connecting aperture connecting the gas vent with the closed portion;

a plurality of ejector pins supported by a first support structure and a gas vent pin supported by a second support structure, the gas vent pin being received in the gas vent and toward an inside surface of the molded product;

injecting molten material into the mold cavity through the material inlet; whereby as the mold cavity begins to be filled, molten material first flows toward the closed portion;

venting a part of gas from a first gap between the gas vent pin and the gas vent as molten material is injected into the mold cavity;

after the mold cavity is filled with molten material from the closed end to about 95 percent of the mold cavity's capacity, the vent pin is driven in the connecting aperture by the second support structure as additional molten material and additional gas are injected into the mold cavity;

making the gas vent pin coplanar with the parting plane to substantially close the connecting aperture and the gas vent of the material injection path, wherein during this time, the remaining amount of the gas and the additional gas are completely vented from the mold cavity into a second gap between the gas vent pin and the connecting aperture and out through the first gap, and whereby the gas vent pin forms a mark on the inside surface of the molded product;

separating the upper mold from the lower mold;

simultaneously moving the ejector pins and the gas vent pin by the first support structure and the second support structure to push the plastic product out from engagement with the lower mold.

* * * * *